United States Patent [19]
Wenzel et al.

[11] Patent Number: 5,208,956
[45] Date of Patent: May 11, 1993

[54] ROLL FOR USE IN CALENDERS AND LIKE MACHINES

[75] Inventors: Reinhard Wenzel, Krefeld; Thomas Hermsen, Issum; Rolf Van Haag, Kerken, all of Fed. Rep. of Germany

[73] Assignee: Kleinewefers GmbH, Krefeld, Fed. Rep. of Germany

[21] Appl. No.: 847,778

[22] Filed: Mar. 6, 1992

[30] Foreign Application Priority Data

Mar. 8, 1991 [DE] Fed. Rep. of Germany ....... 4107440

[51] Int. Cl.⁵ ............................................. B21B 13/02
[52] U.S. Cl. ............................................. 492/7; 492/5
[58] Field of Search ................... 29/112, 113.1, 113.2, 29/116.1, 116.2

[56] References Cited

U.S. PATENT DOCUMENTS

| | | | |
|---|---|---|---|
| 4,498,383 | 2/1985 | Pav | 100/162 B |
| 4,729,153 | 3/1988 | Pav | 29/116 |
| 4,757,584 | 7/1988 | Pav | 19/116.2 |
| 4,779,320 | 10/1988 | Sonnen | 29/116.1 |
| 4,897,905 | 2/1990 | Moschel | 29/116.2 |
| 4,903,517 | 2/1990 | Van Haag et al. | 29/113.2 X |
| 4,964,202 | 10/1990 | Pav et al. | 29/116.2 |
| 5,010,633 | 4/1991 | Brown et al. | 29/113.2 |
| 5,111,566 | 5/1992 | Schnyder et al. | 29/113.2 X |
| 5,119,582 | 6/1992 | Küsters et al. | 29/113.2 X |

FOREIGN PATENT DOCUMENTS

| | | |
|---|---|---|
| 0179730 | 4/1986 | European Pat. Off. . |
| 0340503 | 11/1989 | European Pat. Off. . |
| 0405083 | 1/1991 | European Pat. Off. . |
| 3128140 | 12/1983 | Fed. Rep. of Germany . |
| 3526283 | 2/1987 | Fed. Rep. of Germany . |
| 3014891 | 11/1989 | Fed. Rep. of Germany . |
| 2226101 | 11/1988 | United Kingdom . |

*Primary Examiner*—Timothy V. Eley
*Assistant Examiner*—C. Richard Martin
*Attorney, Agent, or Firm*—Peter K. Kontler

[57] ABSTRACT

A controlled deflection roll for use in calenders and like machines has a non-rotatable carrier for a hollow cylindrical shell the end portions of which are rotatable on bearings and the central portion of which surrounds hydraulically operated shell deforming elements. A first hydraulic circuit is provided to supply heated oil to the deforming elements, and a second hydraulic circuit serves to feed lubricant to the bearings. The two circuits are separated from each other by thermal barriers which are installed between the shell and the carrier intermediate the deforming elements and the bearings. Valves and/or flow restrictors are provided in the second circuit to vary the rate of feed of lubricant to and-/or the flow of lubricant from the bearings. This renders it possible to establish a desired temperature profile along the full length of the peripheral surface of the shell.

21 Claims, 5 Drawing Sheets

ROLL FOR USE IN CALENDERS AND LIKE MACHINES

BACKGROUND OF THE INVENTION

The invention relates to rolls for use in calenders and like machines wherein webs of paper, plastic or textile material are caused to advance through one or more nips each of which is defined by the peripheral surfaces of two neighboring rolls.

Commonly owned U.S. Pat. No. 4,757,584 granted Jul. 19, 1988 to Pav et al. for "Roll for use in calenders and the like" describes and shows a so-called controlled deflection roll wherein a deformable hollow cylindrical shell spacedly surrounds a non-rotatable carrier and can be deformed by one or more sets of deforming elements which are operated by pressurized hydraulic fluid and are surrounded by an elongated central portion of the shell. The set or sets of deforming elements are disposed between two antifriction bearings which surround the carrier and center the end portions of the shell. The axial ends of the shell cooperate with suitable seals to prevent penetration of air into, or to prevent escape of oil from, the interior of the shell. Furthermore, the shell confines two separating devices which are installed between the bearings and the adjacent deforming element or elements to ensure that a heated first liquid can be supplied to the deforming elements and that a preferably cooled or relatively cool second liquid can be fed to and can properly lubricate the bearings. The first liquid can also serve to operate and/or lubricate and/or otherwise beneficially influence one or more additional components or units of the patented roll. A heated first fluid is preferred in many instances in order to ensure that the peripheral surface of the roll is maintained at a requisite (often elevated) temperature for more satisfactory treatment of a running web of paper, plastic, textile material or the like. On the other hand, the temperature of the second liquid should not rise beyond a relatively low upper threshold value because the lubricating properties of a relatively cool second liquid (normally oil) are more satisfactory. The separating devices are supposed to establish barriers between a central zone or region within the shell which receives first liquid and two marginal or outer zones which contain the bearings and receive second liquid. Such rolls have been found to be highly satisfactory because the second liquid maintains the bearings in optimum condition while the first liquid can be used to operate the deforming elements as well as to heat the web-contacting portion of the roll to a desired elevated temperature. In other words, the first liquid cannot adversely influence (overheat) the second liquid, and the second liquid cannot adversely influence (cool) the first liquid. The disclosure of U.S. Pat. No. 4,757,584, together with that of each other U.S. patent referred to in the present specification, is incorporated herein by reference.

European patent application No. 0 179 730 of Allard for "Heated variable crown roll" (published Apr. 30, 1986) discloses a variable deflection or variable crown roll which is heatable and whose web-contacting peripheral surface is relatively short. The end portions of the shell are affixed to smaller-diameter sleeves which surround antifriction bearings mounted on the non-rotatable carrier of the roll. The roll further comprises annular chambers for a so-called insulating oil which is intended to prevent excessive transfer of heat between the lubricant for the bearings and the oil for the deforming means within the shell proper. It has been found that such design cannot invariably ensure adequate heating of the running web which is contacted by the peripheral surface of the roll.

OBJECTS OF THE INVENTION

An object of the invention is to provide a roll which can be used with advantage in calenders and in like machines and is constructed and assembled in such a way that one can ensure the establishment of a desired temperature profile along the full effective length of the peripheral surface of the shell.

Another object of the invention is to provide the roll with novel and improved means for preventing the lubricant for the bearings from unduly influencing the temperature of the web-contacting portion of the shell.

A further object of the invention is to provide a roll wherein the liquid which is used to heat the shell cannot unduly influence the temperature and/or other properties of lubricant for the bearings.

An additional object of the invention is to provide the roll with novel and improved means for feeding a liquid (such as oil) to the bearings for the end portions of the shell.

Still another object of the invention is to provide a machine, such as a calender, which embodies one or more rolls exhibiting the above outlined characteristics.

A further object of the invention is to provide the roll with novel and improved means for controlling the flow of lubricant toward, through and beyond the bearings for the end portions of the shell.

Another object of the invention is to provide a roll wherein the temperature profile along the entire web-contacting portion of the shell can be maintained at a desired optimal value for any selected interval of time.

An additional object of the invention is to provide novel and improved seals for the end portions of the shell in a roll of the above outlined character.

A further object of the invention is to provide a novel and improved method of separating a lubricant for the bearings which carry the end portions of the shell from another liquid which is used to operate the shell deforming means in a roll of the above outlined character.

Still another object of the invention is to provide novel and improved means for regulating the flow of lubricant to and from the bearings for the shell of a roll which is to be used in calenders and like machines.

SUMMARY OF THE INVENTION

The invention is embodied in a controlled deflection roll which can be used in calenders and like machines and comprises a carrier non-rotatably mounted in the machine frame, a flexible rotary hollow cylindrical shell which surrounds the carrier and has first and second end portions and a peripheral surface including first and second marginal sections which surround the respective end portions of the shell and a main section between the marginal sections, hydraulic shell deforming means installed between the carrier and the shell radially inwardly of the main section of the peripheral surface, first and second antifriction bearings which are installed between the carrier and the respective end portions of the shell, means for supplying a first liquid (e.g., oil) to the deforming means, means for feeding a second liquid (e.g., oil) to the first and second bearings, and means for varying the rate of feed of the second fluid.

The supplying means can include means for heating the first liquid and/or the feeding means can include means for cooling the second liquid.

The roll preferably further comprises thermal barriers which are installed between the carrier and the shell, namely intermediate the deforming means and the bearings.

The varying means is preferably adjustable, and the roll then preferably further comprises means for adjusting the varying means as a function of changes of temperature of at least one end portion of the shell. Such adjusting means can comprise signal generating means for monitoring the temperature of at least one end portion of the shell.

The feeding means includes a source of second liquid and means for conveying second liquid from the source to the antifriction bearings. The varying means of such roll can comprise at least one valve in the conveying means.

Alternatively, or in addition to one or more valves, the varying means can comprise at least one flow restrictor, and such flow restrictor can be installed in means for conveying second liquid from the bearings, e.g., back to the source.

The peripheral surface of the shell can constitute a cylindrical surface and the marginal sections of such cylindrical peripheral surface can be coaxial with and can have diameters matching the diameter of the main section of the cylindrical surface, i.e., the cylindrical surface can extend from one axial end to the other axial end of the shell to surround the deforming means as well as the two bearings.

The conveying means of the feeding means can comprise means for conveying first and second main streams of second liquid toward the respective bearings, and the feeding means can further comprise means for dividing each main stream into a primary stream flowing to the respective bearing and a secondary stream flowing to the deforming means. Each dividing means can define for the respective secondary stream a path having a predetermined cross-sectional area. In accordance with one presently preferred embodiment of the invention, each dividing means can comprise a first annular component and an axially movable second annular component which is adjacent the first component and defines with the latter at least one hydrostatic pocket which establishes a path for the respective secondary stream. Each second annular component is acted upon and is thereby biased against the respective first annular component by the respective main stream or primary stream of second fluid. The arrangement may be such that one annular component of each of the just described dividing means is rotatable with the shell and the other annular component of each such dividing means is provided on the carrier so that it does not rotate with the shell. The aforementioned flow restrictors and/or valves of the varying means can be provided in those portions of the conveying means which convey the primary streams of second liquid from the respective dividing means to and beyond the respective bearings.

Each conveying means can comprise a first portion which connects the source of second liquid with the respective dividing means and a second portion for the respective primary stream.

The roll preferably further comprises first and second sealing means provided between the carrier and the respective end portions of the shell outwardly adjacent the respective bearings. The feeding means of such roll can include means for conveying second liquid from the first and second bearings past and radially inwardly of the respective sealing means.

At least one of the first and second sealing means can comprise a first annular member which is rotatable with the shell and a second annular member which is provided on the carrier adjacent the first annular member. One of these annular members is movable relative to and is biased by second liquid against the other annular member. The other annular member can be of one piece with the shell.

The roll can further comprise means for rotating the shell relative to the carrier, and such rotating means can include a housing (e.g., a transmission case) which surrounds the carrier adjacent one end portion of the shell. Such roll can further comprise at least one seal which is interposed between the housing and the one end portion of the shell, and the feeding means of such roll can define at least one path for the flow of second liquid through the housing.

The novel features which are considered as characteristic of the invention are set forth in particular in the appended claims. The improved roll itself, however, both as to its construction and the mode of using the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
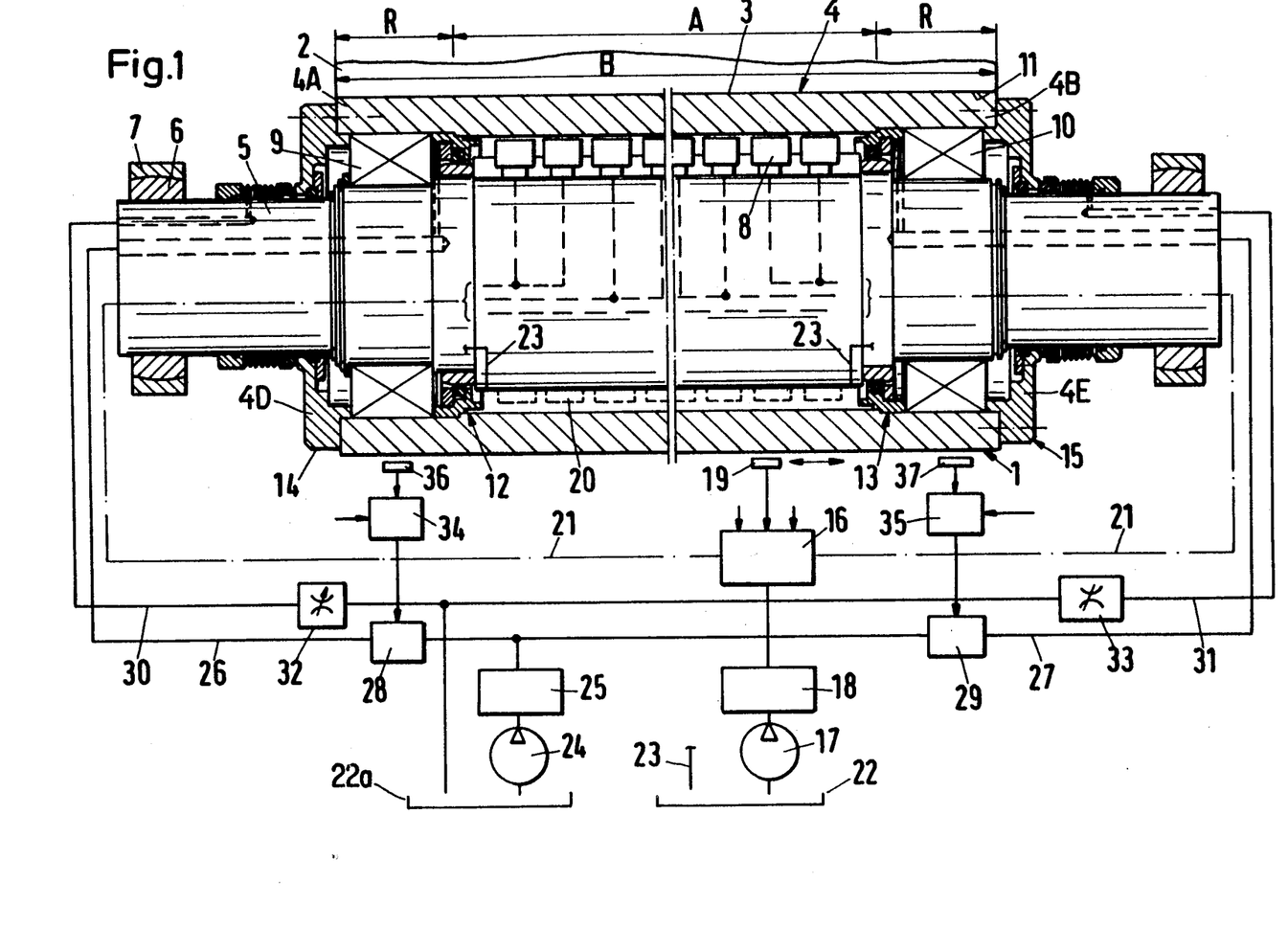
FIG. 1 is a fragmentary schematic partly elevational and partly axial sectional view of a roll which embodies one form of the invention, the block diagram showing the means for supplying the first liquid, the means for feeding the second liquid and the means for varying the rate of feed of the second liquid.

FIG. 1 shows a controlled deflection roll 1 which can be used with a similar roll 2 or with a different roll to define an elongated nip 3 for a running web (not shown) of paper, plastic or textile material. Reference may also be had, for example, to the aforementioned commonly owned U.S. Pat. No. 4,757,584 to Pav et al. and/or to commonly owned U.S. Pat. No. 4,498,383 granted Feb.

12, 1985 to Pav et al. for "Calender". The peripheral surfaces of the rolls 1 and 2 cooperate to treat the running web as a result of the application of heat and/or pressure.

The roll 1 comprises a stationary non-rotatable carrier 5 which is installed in spherical bearings 6 of a stationary frame 7 in a calender or an analogous machine and is spacedly surrounded by an elongated deformable hollow cylindrical shell 4 having a cylindrical peripheral surface 11 including two end sections or marginal sections R and a median or main section A between the marginal sections R. The overall length B of the peripheral surface 11 matches the useful length of the roll 1 and its shell 4, i.e., the roll can treat a web having a width which comes close to or even approximates the overall length B of the peripheral surface 11.

The carrier 5 supports at least one row of hydraulically operated combined bearing and deforming elements (hereinafter called deforming elements) which can change the shape of the shell 4 and are located radially inwardly of the main section A of the peripheral surface 11. FIG. 1 shows a first row of deforming elements 8 which are adjacent the nip 3 and a second row of deforming elements 20 which are located diametrically opposite the deforming elements 8.

The carrier 5 is further surrounded by two antifriction bearings 9, 10 for the respective end portions 4A, 4B of the shell 4. The bearings 9, 10 are located radially inwardly of the respective marginal sections R of the peripheral surface 11. Thus, the deforming elements 8 and 20 are located between the antifriction bearings 9 and 10. The diameters of the marginal sections R are the same as the diameter of the main section A; this is the reason that the shell 4 can define with the roll 2 a nip 3 whose length matches the length B of the peripheral surface 11 from end to end.

Still further, the carrier 5 is surrounded by two separating devices 12, 13 each of which constitutes a thermal barrier. The barrier 12 is disposed axially between the bearing 9 and the adjacent deforming elements 8, 20, and the barrier 13 is disposed between the bearing 10 and the adjacent deforming elements 8, 20. The purpose of these thermal barriers is to prevent a first liquid (e.g., an oil which is used to operate the deforming elements 8 and 20 and, if necessary, certain other hydraulically operated components of the roll 1) from a second liquid (e.g., a suitable oil or another lubricant) which is fed to the bearings 9 and 10. Still further, the carrier 5 is surrounded by a first sealing device 14 for the first end portion 4A of the shell 4 and a second sealing device 15 for the second end portion 4B of the shell 4. These sealing devices prevent penetration of atmospheric air into the interior of the shell 4 and/or the escape of second liquid (hereinafter called lubricant for short) from the interior of the shell into the surrounding atmosphere.

The means for supplying first liquid (hereinafter called oil for short) to the deforming elements and 20 comprises a source 22 (e.g., a sump) of oil, a pump 17 which draws oil from the source 22 and conveys a stream of pressurized oil through a suitable heating unit 18 (e.g., a heat exchanger wherein oil flowing from the outlet of the pump 17 exchanges heat with another fluid), and a control unit 16 which serves to supply streamlets of heated oil to selected deforming elements 8 and/or 20. The control unit 16 can comprise a microprocessor with several inputs (three shown at a, b and c) for selected signals each of which denotes a different parameter requiring consideration in selecting the deforming elements 8 and/or 20 and/or the bias of selected deforming elements upon the adjacent portions of the internal surface of the shell 4. The parameters can include the desired and actual pressure of the deforming elements 8 and/or 20 upon the shell 4, the desired and actual temperature of certain portions of the shell and/or others. FIG. 1 shows, merely by way of example, a temperature monitoring device 19 which is reciprocable along the peripheral surface 11 of the shell 4 and serves to transmit to the corresponding input b of the control unit 16 signals denoting the actual temperature of the peripheral surface. Thus, the monitoring device 19 can be said to serve as a means for ascertaining the actual temperature profile of the shell 4 at its peripheral surface 11. Reference may be had to the aforementioned commonly owned U.S. Pat. No. 4,498,383 to Pav et al. which discloses that the temperature of the peripheral surface of a roll can be monitored by a battery of stationary sensors or by a sensor which is reciprocable along the peripheral surface between the axial ends of the shell. Commonly owned U.S. Pat. No. 4,729,153 granted Mar. 8, 1988 to Pav et al. for "Roll for use in calenders and the like" discloses a control unit which can be utilized for simultaneous regulation of pressure in the nip and of the temperature at the peripheral surface of at least one of the rolls which define the nip. FIG. 1 further shows conduits 21 (indicated by phantom lines) which are used to convey pressurized oil from the control unit 16 to selected deforming elements 8 and/or 20, and portions of further conduits 23 which serve to return oil from the selected deforming elements 8 and/or 20 (for example, from the interior of the shell 4 if the oil which is supplied to selected deforming elements is caused or permitted to overflow into the interior of the shell) back into the source 22.

The roll 1 further comprises means for feeding lubricant to the antifriction bearings 9 and 10. Such feeding means comprises a source 22a of lubricant (e.g., a sump), a pump 24 which draws lubricant from the source 22a and conveys a flow of pressurized lubricant to a cooling unit 25 (e.g., a heat exchanger wherein the flow of lubricant transmits heat to another fluid), and means—including conduits 26 and 27—for conveying cooled lubricant from the cooling unit 25 toward the respective bearings 9 and 10. In accordance with a feature of the invention, the roll 1 further comprises means for varying the rate of feed of lubricant to and/or from the bearings 9 and 10. Such varying means includes regulators (e.g., in the form of valves) 28, 29 which are respectively installed in the conduits 26, 27 and/or regulators (e.g., in the form of adjustable flow restrictors) 32, 33 respectively installed in conduits 30, 31 forming part of the aforementioned lubricant conveying means and serving to return lubricant from the bearings 9, 10 to the source 22a.

The valves 28, 29 are respectively adjusted by control units 34, 35 each of which has several inputs for signals denoting various parameters which warrant consideration in determining the rate of feed of lubricant to the bearings 9 and 10. For example, one input of each of the two control units 34, 35 can receive signals from a corresponding signal generating monitoring device 36, 37 which is adjacent the left-hand marginal section R and the right-hand marginal section R, respectively, of the peripheral surface 11 of the shell 4. This renders it possible to regulate the rate of feed of cooled lubricant to the bearings 9 and 10 for the purpose of ensuring that the temperature of the respective marginal sections R of the peripheral surface 11 will equal or approximate an optimal value, preferably (or at least in certain instances) the temperature of the main section A.

Figure 2:
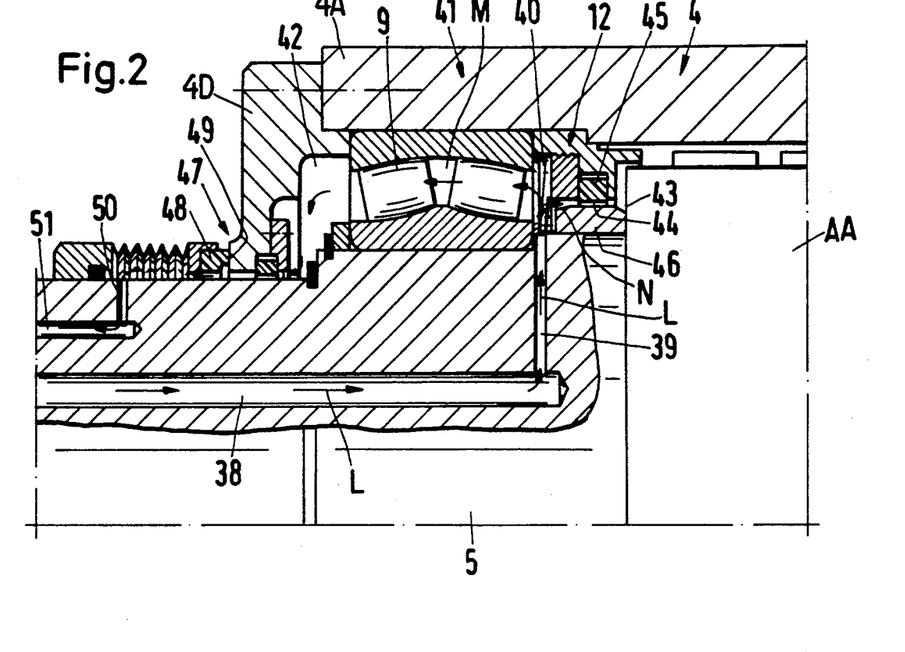
FIG. 2 is an enlarged fragmentary axial sectional view of a detail in the roll of FIG. 1.

The details of those portions of the roll 1 which are adjacent the two end portions 4A, 4B of the shell 4 and are considered to be relevant for further understanding of the present invention are shown in FIG. 2. FIG. 2 merely shows that part of the roll 1 which includes the end portion 4A of the shell 4 because the other part of the roll (namely the one including the end portion 4B of the shell) is a mirror image of the illustrated part. The conduit 26 of the lubricant supplying means delivers a main stream L of lubricant from the cooling unit 25 to an axially parallel bore or passage 38 of the carrier 5, and the passage 38 delivers the main stream L to a radially outwardly extending passage or bore 39 which delivers the main stream to the annular distributor chamber 40 of a flow divider or flow dividing means 41 serving to divide the main stream from the passage 39 into a first or primary stream M serving to lubricate the bearing 9 and to be returned to the source 22a via conduit 30, and a second or secondary stream N which is admitted into the central portion AA of the internal space of the shell 4, namely into that portion of the internal space which accommodates the deforming elements 8 and 20. That portion of the lubricant conveying means which serves to confine and guide the primary stream M includes a first or main conduit 42, and that portion of the lubricant conveying means which serves to confine and guide the secondary stream N includes a second or branch conduit 43. A portion 44 of the conduit 43 defines a path having a predetermined cross-sectional area for the flow of lubricant into the portion AA of the internal space of the shell 4 adjacent the thermal barriers 12, 13 to be returned to the source 22 via conduits 23.

The flow divider 41 comprises two coaxial annular components 45 and 46 which define the path 44 of predetermined cross-sectional area. The annular component 45 is a ring which is or can be rotatable with the shell 4, and the annular component 46 is a ring which is surrounded by the ring 45 and is, or can be, fixed to the non-rotatable carrier 5. The exact ratio of lubricants forming the primary and secondary streams M and N will depend on the throttling action upon the lubricant.

The secondary stream N is caused to mix with oil which has been supplied by the conduits 21 and gathers in the interior of the shell 4 at the thermal barriers 12, 13 to be returned into the source 22 via conduits 23. Thus, the relatively small percentage of the main stream L which forms the secondary stream N can be used to cool the oil adjacent the barrier 12, and the major percentage of the main stream L (namely the primary stream M) is used to lubricate the bearing 9. The rate of feed of lubricant which forms the primary stream M is varied (adjusted) at 28 and/or at 32) so that the lubricant prevents overheating of the respective marginal portion R of the peripheral surface 11 of the shell 4. Such cooling of the marginal section R might be necessary if the dissipation of heat by the end portion 4A of the shell does not suffice to maintain the temperature at R within a desirable or optimal range.

The sealing device 14 comprises a rotating mechanical seal 47 which seals the conduit 42 from the atmosphere downstream of the bearing 9 (as seen in the direction of flow of the primary stream M toward, through and beyond this bearing). The arrangement is such that a portion of the conduit 42 is located radially inwardly of and extends axially along the mechanical seal 47. Heat which is generated as a result of friction between the annular members 48, 49 of the seal 47 can be dissipated into the atmosphere and/or is transmitted to the primary stream M which flows back into the source 22a so that the lubricant can be cooled again on its way from the pump 24, through the cooling unit 25 and back into the conduits 26, 27. The flow of primary stream M in the conduit 42 is such that the lubricant urges the annular member 48 against the adjacent surface of the annular member 49. The latter can be a part of a radially extending flange 4D which is bolted to (and can be considered an integral part of) the end portion 4A of the shell 4. If the pressure of lubricant in the conduit 42 rises, the bias of the lubricant upon the annular member 48 increases so that the latter is urged against the annular member 49 with an increasing force to prevent or limit leakage of lubricant through the seal 47 and into the surrounding atmosphere. The conduit 42 discharges the primary stream M into a radially extending bore or passage 50 of the carrier 5, and the passage 50 communicates with an axially parallel passage 51 which is also provided in the carrier 5 and serves to deliver lubricant into the return conduit 30 wherein the rate of flow of such lubricant can be regulated by the adjustable flow restrictor 32 of the varying means.

Figure 3:
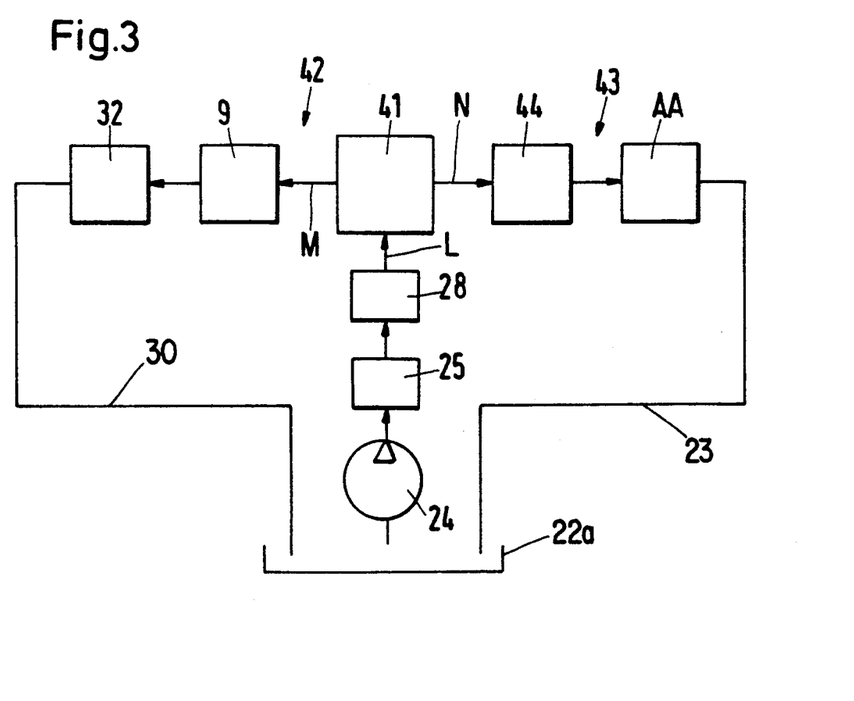
FIG. 3 is a block diagram showing certain parts of the means for feeding the second liquid and certain parts of the varying means in the roll of FIGS. 1 and 2.

FIG. 3 is a flow diagram of that part of the lubricant feeding means which serves to lubricate the bearing 9 and to deliver some lubricant into the portion AA of the internal space of the shell 4 between the thermal barriers 12 and 13. Thus, the pump 24 draws lubricant from the source 22a and supplies it to the cooling unit 25 which delivers a main stream L to the flow divider 41. The latter admits the primary and secondary streams M, N into the respective conduits 42, 43. The stream M flows through the bearing 9 and thereupon through the adjustable flow restrictor 32 in the conduit 30 back into the source 22a. The stream N flows along the aforementioned path 44 of predetermined cross-sectional area (defined by the conduit 43) and into the portion AA of the internal space of the shell 4, i.e., between the thermal barriers 12 and 13. FIG. 3 further shows that the first liquid can be the same as the second liquid. This renders it possible to dispense with one of the pumps 17, 24 and to utilize the other pump as a part of means for supplying oil to the deforming elements 8 and/or 20 as well as a part of the means for feeding lubricant to the bearings 9 and 10. The valve 28 influences the rate of flow of the entire main stream L whereas the flow restrictor 32 influences the rate of flow of the primary stream M.

A feature of the invention resides in the recognition that the parameters which influence the characteristics of the end portions 4A, 4B of the roll 1 exert a considerable influence upon the characteristics (particularly the temperature) of the entire roll, i.e., also upon the characteristics of the main or median portion of the roll which surrounds the deforming elements 8 and 20, and vice versa. One would assume that the temperature of the peripheral surface 11 would decrease in a direction from the ends of the main section A toward the respective marginal sections R because the end portions 4A and 4B of the shell 4 are not heated by lubricant. As described hereinabove, the lubricant (second fluid) is or can be cooled (at 25) prior to being conveyed to the bearings 9 and 10. It has been found, in actual practice, that (in the absence of any undertakings to the contrary)

the temperature of the roll 1 actually increases in a direction from the median portion toward the end portions 4A and 4B, and the temperature rise is proportional to the temperature rise of oil which is supplied to the deforming elements 8 and 20. Thus, if the heating unit 18 is adjusted to raise the temperature of oil which flows into the conduits 21, the rate at which the temperature of the peripheral surface 11 rises in directions toward and in the end portions 4A, 4B and the respective marginal sections R will be more pronounced than if the heating action upon the oil is less pronounced. The situation is further aggravated if the width of the running web which passes through the nip 3 of the rolls 1 and 2 is less than the length B. This will be readily appreciated since the web is then too narrow to withdraw heat from the marginal sections R of the peripheral surface 11. A moist web is more likely to withdraw substantial quantities of heat than a relatively dry web because moisture evaporates, at least in part, during passage through the nip 3 and this results in pronounced withdrawal of heat from the peripheral surface 11 of the roll 1.

Excessive heating of the peripheral surface 11 in the regions of its marginal sections R could have an adverse influence upon the quality of the web. Thus, if the web is sufficiently wide to contact the marginal sections R during travel through the nip 3 of the rolls 1 and 2, and if the temperature of the marginal sections R is higher than the temperature of the main or median section A, the diameters of the end portions 4A and 4B will increase beyond the diameter of the central portion of the roll 2 whereby the marginal portions of the web will be subjected to excessive thermal as well as to undesirably high mechanical stresses as a result of contact with the marginal sections R.

The just discussed problems are overcome by the novel expedient of providing means (28, 29 and/or 32, 33) for varying the rate of feed of lubricant to the bearings 9 and 10. This renders it possible to control the temperature (and hence the outer diameters) of the end portions 4A and 4B in a simple and efficient manner and with a high degree of accuracy and reproducibility. Thus, if the rate of feed of cooled lubricant is increased, such lubricant exerts a more pronounced cooling action upon the bearings 9 and 10 and hence also upon the respective end portions 4A and 4B of the shell 4. In other words, the means 28, 29 and/or 32, 33 for varying the rate of feed of lubricant to and/or from the bearings 9 and 10 renders it possible to establish and maintain an optimum temperature profile along the entire peripheral surface 11, i.e., from the flange 4D at the end portion 4A to the flange 4E at the end portion 4B of the shell 4. Such temperature profile is selected with a view to prevent undue thermal as well as undue mechanical stressing of those (marginal) portions of the running web which contact the marginal sections R of the peripheral surface 11 when the machine including the rolls 1 and 2 is in actual use.

The valves 28, 29 and/or the flow restrictors 32, 33 of the varying means are adjustable in order to ensure that the temperature of the end portions 4A, 4B of the shell 4 can be increased or reduced within a relatively wide range which suffices to compensate for a number of anticipated variables including the materials of successively treated webs, the moisture content of the web, the width of the web, the speed of advancement of the web and/or others. This enhances the quality as well as the uniformity of each web which is treated in the apparatus using one or more rolls constructed and assembled in a manner as described for the roll 1.

The rate of feed of lubricant can be regulated in a fully automatic way, for example, in response to signals from the temperature monitoring devices 36, 37 which are connected with the corresponding regulators 34, 35 which, in turn, serve to adjust the respective valves 28 and 29. The monitoring devices 36, 37 and/or additional monitoring devices can be used to transmit signals to the adjustable flow restrictors 32 and 33. The temperature monitoring devices 36, 37 and the regulators 34, 35 render it possible to select the temperatures of marginal sections R of the peripheral surface 11 with a high degree of accuracy and to thus select the temperature profile of the entire peripheral surface 11. The temperature of the main section A of the peripheral surface 11 is regulated by the heating unit 18 in conjunction with the regulator 16 and temperature monitoring device 19.

The valves 28, 29 of the varying means can be replaced with adjustable flow restrictors and/or the flow restrictors 32, 33 can be replaced with preferably adjustable valves. Furthermore, the varying means can employ adjustable pumps (not shown) in lieu of or in addition to the valves 28, 29 and/or flow restrictors 32, 33. The rate of feed of lubricant to and/or from the bearings 9, 10 (i.e., to and from the end portions 4A, 4B of the shell 4) can be varied directly or indirectly, e.g., by varying the pressure of lubricant downstream of the outlet of or in the pump 24.

The present invention can be embodied with particular advantage in rolls employing shells with peripheral surfaces 11 whose diameter is constant from end to end. Such shells can be used to the treatment of relatively wide or narrow webs because the temperature of the marginal sections R of the peripheral surface 11 can be regulated with a desired degree of accuracy irrespective of whether the marginal portions of the running web do or do not contact the end portions 4A, 4B and irrespective of the moisture content of the running web. A shell 4 having a peripheral surface 11 with a constant diameter from end to end is preferred in many instances because it contributes to the versatility of the machine in which the roll is put to use. The width of the marginal sections R of the peripheral surface 11 can be rather pronounced; this renders it possible to influence and accurately control the temperatures and/or outer diameters of relatively long end portions 4A and 4B, i.e., the lubricant feeding means and the means for varying the rate of feed of lubricant can influence the diameters and/or the temperature of relatively wide sections of the peripheral surface 11 of a relatively long or a relatively short roll.

The flow divider 41 will be put to use if the admixture of a certain percentage of lubricant to the oil for the deforming elements 8 and/or 20 does not affect the quality of oil, e.g., if the first liquid is the same as the second liquid. That portion (secondary streams N) of lubricant which can mix with oil downstream of the respective paths 44 can serve to cool oil adjacent the thermal barriers 12, 13 and to thus reduce the rate at which heat which is generated by heated oil and is transmitted to the central portion of the shell 4 is being propagated to the end portions 4A and 4B. Such cooling of oil adjacent the thermal barriers 12, 13 is particularly desirable and advantageous if the running web is relatively narrow so that its marginal portions do not contact the marginal sections R of the peripheral surface 11, i.e., when the web cannot withdraw heat from the end portions 4A, 4B of the shell 4. Furthermore, cooling of oil adjacent the barriers 12, 13 is desirable and advantageous if the diameters of the marginal sections R are smaller than the diameter of the main section A, i.e., when the running web can contact only the main section A of the peripheral surface 11. Cooling of oil at the barriers 12, 13 then prevents the transfer of excessive quantities of heat to smaller-diameter end portions 4A and 4B which could result in overheating of lubricant for the bearings 9 and 10 or analogous bearings. The valves 28, 29 and/or the flow restrictors 32, 33 can be used as a means for varying the secondary streams N because the quantity of lubricant which enters the portion AA of the internal space of the shell 4 via conduits 43 varies in response to variations of the quantity of lubricant which forms the main streams L and/or the primary streams N.

In the flow divider 12 which is shown in FIG. 2, the ratio of lubricant in the secondary stream N to lubricant in the primary stream M is determined by the cross-sectional area of the path 44 which is defined by the conduit 43. Thus, the portion 44 of the conduit 43 acts not unlike a flow restrictor and determines that percentage of the main stream L which can enter the portion AA of the internal space of the shell 4 between the thermal barriers 12 and 13.

An advantage of the structure which is shown in FIG. 2 is that the flow divider 41 receives a main stream L of relatively cool lubricant because such lubricant flows from the cooling unit 25 practically directly into the distributor chamber 40. This ensures that the bearing 9 is contacted by a primary stream M of relatively cool lubricant. Furthermore, the pressure of lubricant which flows from the pump 24 and practically immediately to the distributor chamber 40 is relatively high so that a rather high percentage of cool lubricant (primary stream M) flows to and cools the bearing 9 and thereafter the mechanical seal 47. Moreover, even the relatively low percentage of lubricant which forms the secondary stream N can exert a rather pronounced influence upon the temperature of oil in the portion AA of the internal space of the shell 4 adjacent the thermal barrier 12 because such secondary stream N contains a relatively cold lubricant.

The feature that the primary stream M of lubricant flows radially inwardly of and axially past the mechanical seal 47 is desirable and advantageous because this ensures the withdrawal from the (annular members 48, 49) of a substantial quantity of friction-induced heat to thus prolong the useful life of the mechanical seal. Another advantage of the mechanical seal 47 is that the force with which the annular member 48 bears against the adjacent surface of the annular member 49 increase with increasing pressure of lubricant in the conduit 42 downstream of the bearing 9. This ensures that the sealing action of the annular members 48, 49 remains satisfactory or even improves if the rate of flow of lubricant radially inwardly of the mechanical seal 47 is increased, e.g., when it is desirable or necessary to greatly or considerably reduce the temperature of the end portion 4A of the shell 4 and this involves a rise of pressure of lubricant at the annular member 58.

Figure 4:
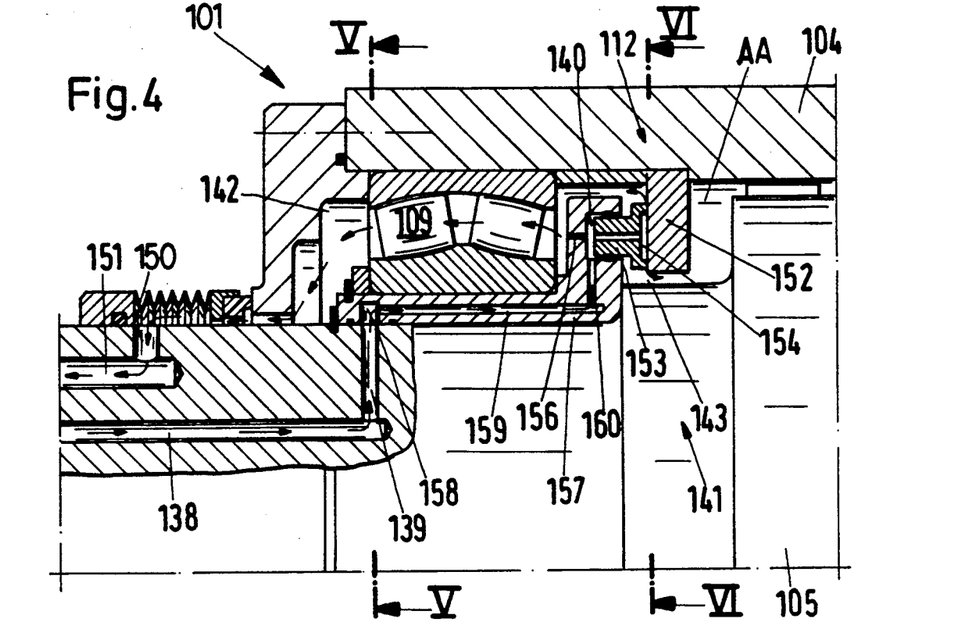
FIG. 4 is a fragmentary axial sectional view of a second roll.
Figure 5:
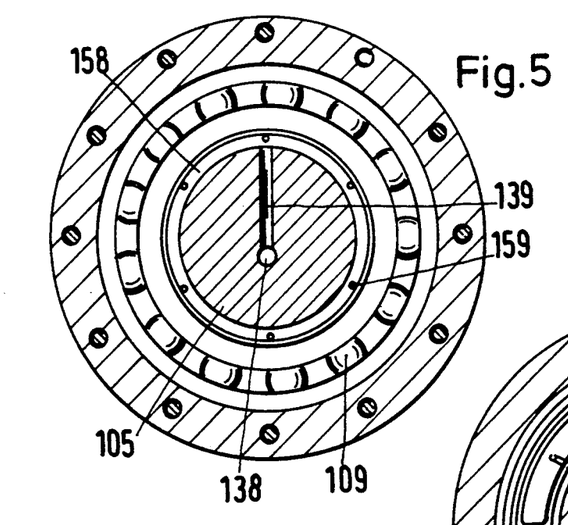
FIG. 5 is a smaller-scale transverse sectional view substantially as seen in the direction of arrows from the line V—V in FIG. 4.
Figure 6:
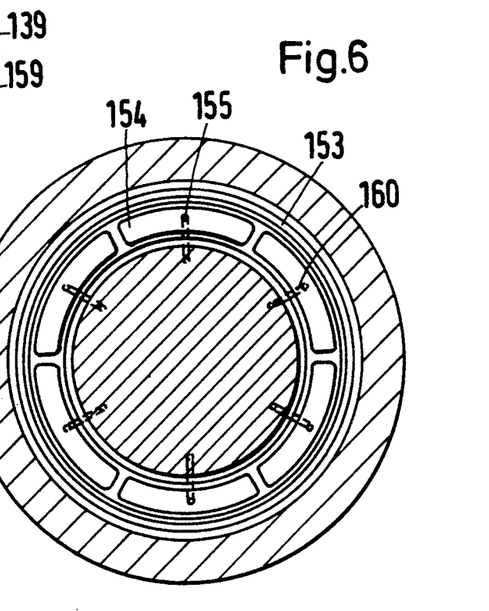
FIG. 6 is a smaller-scale transverse sectional view substantially as seen in the direction of arrows from the line VI—VI in FIG. 4.

FIGS. 4 to 6 illustrate certain details of a roll 101 which constitutes a first modification of the roll 1 of FIGS. 1 to 3. All such parts of the roll 101 which are identical with or clearly analogous to corresponding parts of the roll 1 are denoted by similar reference characters plus 100 The flow divider or flow dividing means 141 comprises a first annular component 152 which is secured to and rotates with the shell 104, and a second annular component 153 which is mounted on the non-rotatable carrier 105 and is adjacent the annular component 152. The component 153 is provided with hydrostatic pockets 154 next to the adjacent radially extending surface of the component 152, and the component 153 is acted upon by pressure of lubricant in the distributor chamber 140 so that it is urged against the annular component 152 (in a direction to the right, as seen in FIG. 4). Throttling orifices 155 (FIG. 6) are provided to establish communication between the pockets 154 and the distributor chamber 140. One or more additional flow restricting orifices 156 are provided to connect the distributor chamber 140 with the conduit 142 for the primary stream of lubricant toward, through and beyond the antifriction bearing 109. The distributor chamber 140 of the flow divider 141 is defined by an insert 157 which surrounds the carrier 105 and is partially surrounded by the inner race of the bearing 109. The insert 157 has an annular groove or recess 159 which establishes communication between the radially outwardly extending passage 139 of the carrier 105 and an axially parallel passage 159 provided in the insert 157 and communicating with the distributor chamber 140 by way of a radially outwardly extending passage 160. The conduit 143 receives lubricant which leaks from the pockets 154 and possibly some lubricant which happens to leak around the annular component 153, and the conduit 143 delivers a secondary stream of lubricant into the central portion AA of the internal space of the shell 104. The primary stream which flows in the conduit 142 is returned into the source of lubricant (not shown in FIGS. 4 to 6) through the passages 150, 151 of the carrier 105. The annular member 153 can move axially of the shell 104, e.g., in response to thermally induced changes of its dimensions. Some of the lubricant which escapes from the pockets 154 can flow into the conduit 142 for the primary stream of lubricant. The width of the clearance between the annular components 152, 153 can vary in actual use of the roll 101, e.g., in response to rising pressure of lubricant in the distributor chamber 140.

Figure 7:
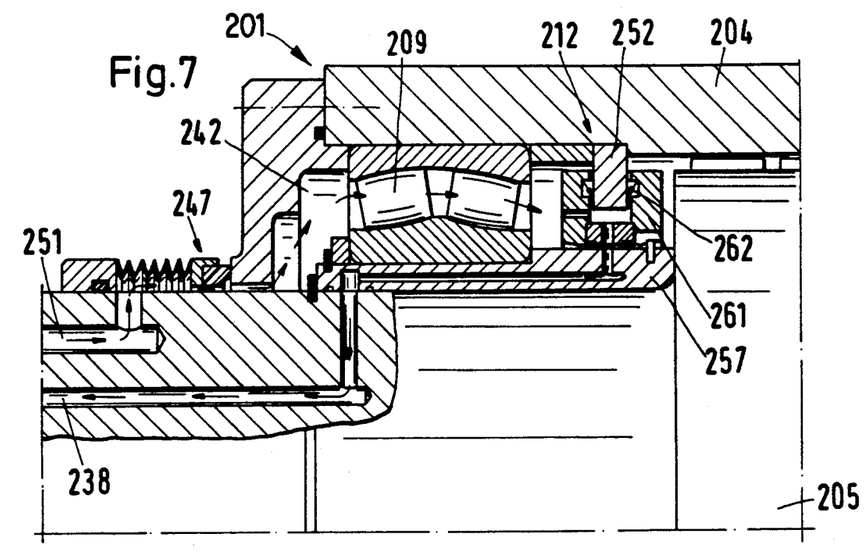
FIG. 7 is a fragmentary axial sectional view of a third roll.

FIG. 7 shows certain parts of a third roll 201. All such parts of this roll which are identical with or clearly analogous to corresponding parts of the roll 1 are denoted by similar reference characters plus 200. The roll 201 does not utilize a flow divider, i.e., the main stream which is supplied by the axially parallel passage 251 of the carrier 205 also constitutes a primary stream which flows through the antifriction bearing 209 by way of a conduit 242 subsequent to flowing radially inwardly of the rotary mechanical seal 247 and thereafter through the passage 238 back to the source of lubricant (not shown in FIG. 7). It will be seen that the direction of flow of lubricant through the bearing 209 is reversed, i.e., the lubricant enters the bearing 209 in a direction from the mechanical seal 247 to thereupon flow toward the median portion of the shell 204 prior to flowing back into the source. An advantage of the roll 201 is that the cooling action of lubricant upon the seal 247 is particularly satisfactory because the lubricant contacts the annular member or members of the seal 247 on its way from the cooling unit toward the bearing 209.

The thermal barrier 212 of the roll 201 comprises an annular component 252 which rotates with the shell 204 and is surrounded at three sides by a second annular member 261 which has a U-shaped cross-sectional outline and is mounted on the carrier 205. The annular component 261 can be assembled of three ring-shaped portions and its radially extending portions have annular grooves for sealing elements 262. Additional sealing elements are installed between the axially extending portion of the annular component 261 and the insert 257. The annular component 261 is movable axially of the insert 257, e.g., to compensate for different thermally induced expansion of the shell 204 and carrier 205.

Figure 8:
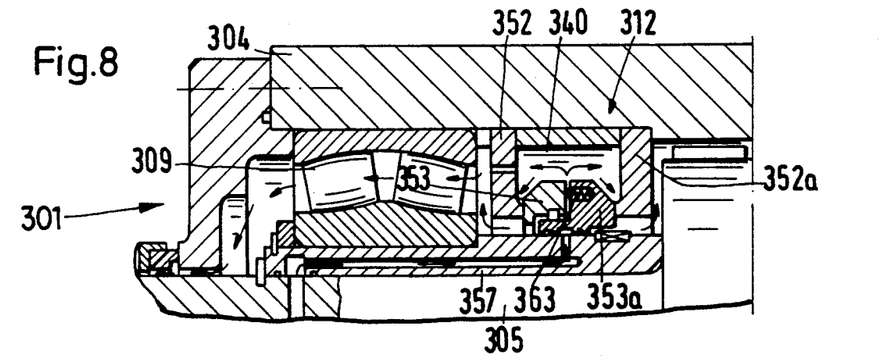
FIG. 8 is a fragmentary axial sectional view of a fourth roll.

A portion of a fourth roll 301 is shown in FIG. 8. All such parts of this roll which are identical with or clearly analogous to the corresponding parts of the roll 1 are denoted by similar reference characters plus 300. The thermal barrier 312 comprises two annular components 352, 352a which rotate with the shell 304. The annular components 352, 352a are spaced apart from each other in the axial direction of the shell 304 in order to provide room for two rings 353, 353a which are biased axially and away from each other by one or more coil springs 363 and/or other suitable biasing means. The distributor chamber 340 is located radially outwardly of the rings 353, 353a and axially between the annular components 352, 352a. The pressure of lubricant in the chamber 340 is utilized to bias the rings 353, 353a axially and away from each other so that each of these rings bears against the adjacent annular component 352, 352a, respectively. The rings 353, 353a are movable axially of the insert 357 to permit thermally induced expansion or contraction of the shell 304 relative to the carrier 305 and/or vice/-versa.

Figure 9:
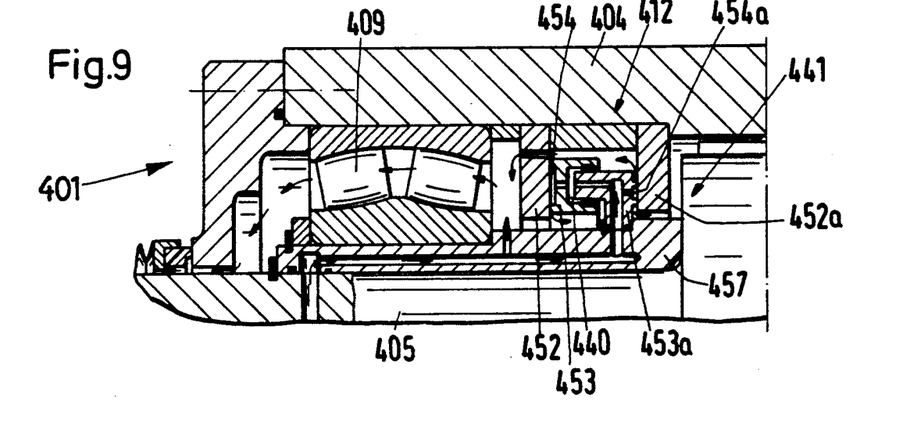
FIG. 9 is a fragmentary axial sectional view of a fifth roll.

The FIG. 9 shows a portion of a fifth roll 401. All such parts of this roll which are identical with or clearly analogous to corresponding parts of the roll 1 are denoted by similar reference characters plus 400. The thermal barrier 412 comprises two annular components 452, 452a which rotate with the shell 404 and are spaced apart from each other in the axial direction of the shell. The annular components 452, 452a provide room for two rings 453, 453a which are formed with hydrostatic pockets 454, 454a adjacent the neighboring radially extending surfaces of the annular components 452, 452a, respectively. The distributor chamber 440 is disposed between the rings 453, 453a and these rings have orifices which establish communication between the chamber 440 and the respective hydrostatic pockets 454, 454a. Pressurized lubricant in the chamber 440 acts upon the rings 453, 453a and urges these rings axially away from each other and toward the respective annular components 452, 452a.

Figure 10:
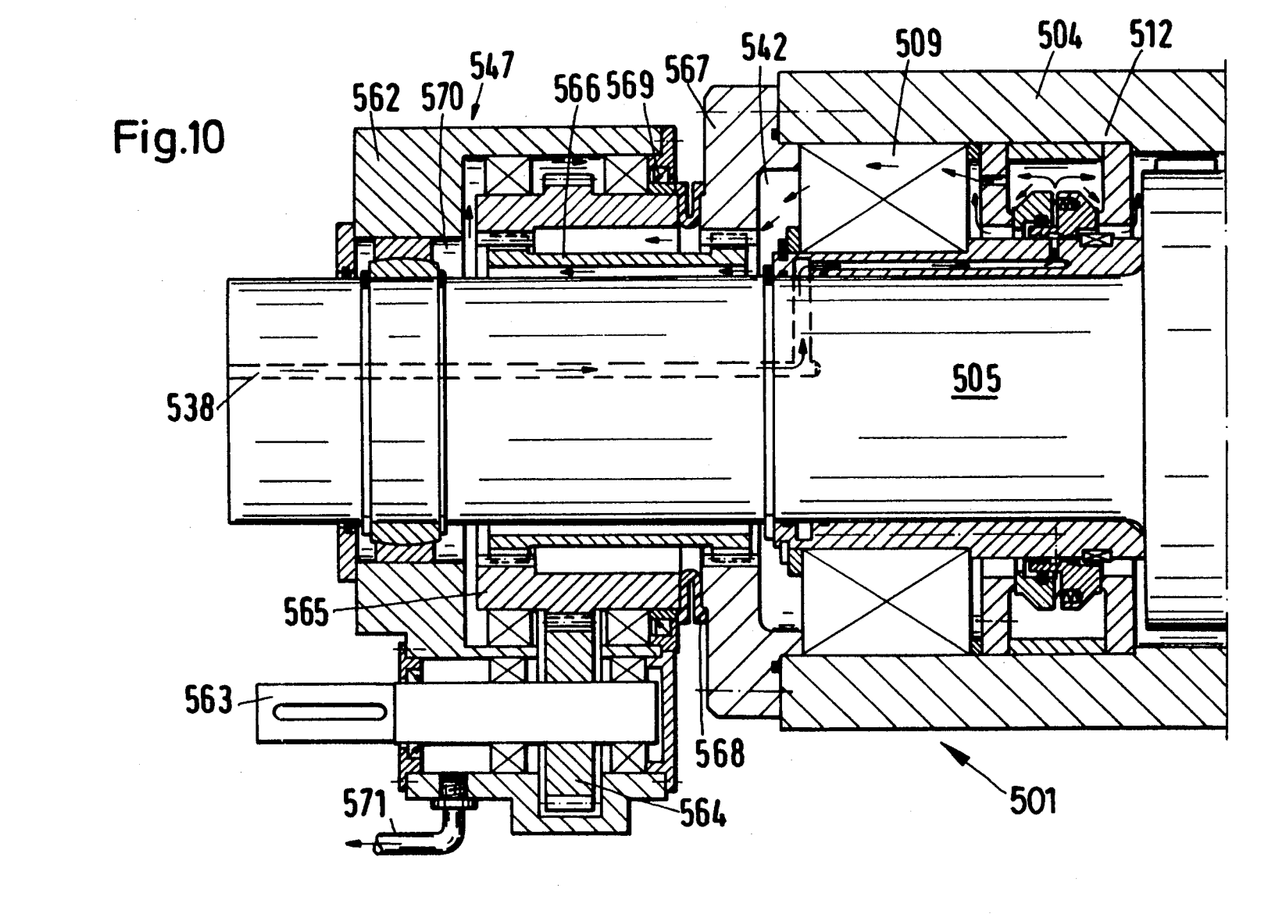
FIG. 10 is a fragmentary partly elevational and partly axial sectional view of a sixth roll.

Referring to FIG. 10, there is shown a roll 501 which includes a carrier 505, a shell 504 and means for rotating the shell relative to the carrier. All such parts of this roll which are identical with or clearly analogous to corresponding parts of the roll 1 are denoted by similar reference characters plus 500. The thermal barrier 512 is analogous to the thermal barrier 312 of the roll 301 which is shown in FIG. 8; however, it is equally within the purview of the invention to employ any other suitable thermal barrier. The carrier 505 extends into the housing or case 562 of a means for rotating the shell 504, and the housing 562 includes or can be said to form part of the rotary mechanical seal 547. The rotating means includes an input shaft 563 which is provided with a pinion 564 in mesh with a spur gear 565. The latter transmits torque to the flange 567 of the shell 504 by way of a toothed coupling 566. An annular elastic seal 568 is installed between the gear 565 and the flange 567, and an annular lip seal 569 (or an analogous seal) is provided between the housing 562 and the gear 565. The seals 568 and 569 establish a barrier between the internal space 570 of the housing 562 and the surrounding atmosphere. The lower portion oft he housing 562 is provided with an outlet 571 for lubricant which flows in the conduit 542 from the antifriction bearing 509 back to the source (not shown in FIG. 10). Cooled lubricant is fed from the source to the thermal barrier 512 and thence into the bearing 509 through an axially parallel passage 538 in the carrier 505. Lubricant which flows from the bearing 509 back to the source via outlet 571 perform the additional function of lubricating the rotary parts of the means for rotating the shell 504. Such lubricant performs a total of at least three functions, namely, lubricating the bearing 509, cooling the respective end portion of the shell 504, and lubricating the means for rotating the shell 504.

The direction of circulation of lubricant from the source to the end portion of the shell 504 and back to the source can be reversed. Thus, the outlet 571 or another part of the housing 562 can be used to admit freshly cooled lubricant which is used to first cool and lubricate the rotary parts of the means for rotating the shell 504, to thereupon lubricate the bearing 509 and to cool the respective end portion of the shell 504.

The improved roll is susceptible of numerous additional modifications without departing from the spirit of the invention. For example, the inner races of the antifriction bearings for the end portions of the shell need not be fixedly mounted on the carrier for the shell. It is equally possible to employ antifriction bearings which are movable with the respective end portions of the shell radially of the carrier. Reference may be had, for example, to commonly owned U.S. Pat. No. 4,779,320 granted Oct. 25, 1988 to Sonnen for "Roll for use in calenders". Thus, each bearing can be mounted on a sleeve which is movable radially of the carrier.

It is also possible to design the shell of the improved roll in such a way that the axial length of the web-contacting section of the peripheral surface is less than the axial length of the entire shell. Referring again to FIG. 1, the shell 4 can be designed in such a way that the working (web-contacting length (B) of its peripheral surface 11 equals or approximates the axial length of the main section A.

The exact construction and mode of operation of the deforming elements (such as the elements 8 and 20 in FIG. 1) forms no part of the invention. For example, such deforming elements can be of the type described in German Pat. No. 31 28 140 granted Dec. 15, 1983 to Küsters for "Roll". The deforming elements which are disclosed in this German patent are provided with arcuate liquid-receiving chambers.

If the improved roll is provided with flow dividers at the thermal barriers to admit certain percentages of lubricant into the central portion AA of the internal space of the roll, the pressure of lubricant which enters the flow dividers must at least slightly exceed the pressure of oil in the central portion of the shell.

It is further within the purview of the invention to replace the adjustable flow restrictors (such as 32, 33) of the means for varying the rate of flow of lubricant to the antifriction bearings with fixed (non-adjustable) flow restrictors; for example, the non-adjustable flow restrictors which are to replace the adjustable flow restrictors 32, 33 can be constituted by selected portions of the return conduits 30 and 31, and each such selected portion has a predetermined cross-sectional outline to throttle the flow of returning lubricant to a predetermined extent.

Still further, it is possible to omit the temperature monitoring device 36 and/or 37 if the length of the path for the temperature monitoring device 19 is selected in such a way that the device 19 can monitor the temperature of the peripheral surface 11 all the way to the flange 4D and/or 4E.

A further modification can include mounting of the antifriction bearings axially outwardly of the shell, for example, in a manner as disclosed in European patent application No. 0 179 730 of Allard. This publication describes and shows a roll wherein the antifriction bearings are installed in sleeve-like annular extensions which are affixed to the respective ends of the shell. Still further, and if the improved roll employs sleeve-like extensions of the type disclosed by Allard, the antifriction bearing can surround the respective extensions and their outer races can be mounted in the frame of the machine in which the roll is put to use. All such modifications will be readily comprehended by those skilled in the art without additional illustrations.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A controlled deflection roll comprising a carrier; a flexible rotary shell spacedly surrounding said carrier and having first and second end portions and a peripheral surface including first and second marginal sections surrounding the respective end portions of said shell and a main section between said marginal sections; hydraulic shell deforming means disposed between said carrier and said shell radially inwardly of said main section and including at least one row of deforming elements; first and second bearings disposed between said carrier and the respective end portions of said shell; means for supplying a first liquid to said deforming elements whence the first liquid overflows into a space between said carrier and said shell; means for feeding a second liquid to said bearings comprising a source of second liquid, means for conveying first and second main streams of second liquid from said source toward the respective bearings and means for dividing each of said main streams into a primary stream flowing to the respective bearing and a secondary stream flowing toward said deforming elements, said flow dividing means comprising a first annular component and an axially movable second annular component adjacent said first component and defining therewith at least one hydrostatic pocket which establishes a path for the respective secondary stream, each second component being acted upon and being biased against the respective first component by the respective main stream of second liquid, one annular component of each of said flow dividing means being rotatable with said shell and the other annular component of each of said dividing means being provided on said carrier; and means for varying the rate of feed of said second liquid.

2. The roll of claim 1, wherein said supplying means includes means for heating the first liquid.

3. The roll of claim 1, wherein said feeding means further includes means for cooling the second liquid.

4. The roll of claim 1, further comprising thermal barriers provided between said carrier and said shell intermediate said deforming means and said bearings.

5. The roll of claim 1, wherein said varying means is adjustable and further comprising means for adjusting said varying means as a function of changes of temperature of at least one end portion of said shell.

6. The roll of claim 5, wherein said adjusting means includes signal generating means for monitoring the temperature of at least one end portion of said shell.

7. The roll of claim 1, wherein said means includes a source of second liquid and means for conveying second liquid from said source to said varying means comprises at least one valve in said conveying means.

8. The roll of claim 1, wherein said feeding means further includes means for conveying second liquid from said bearings, said varying means comprising at least one flow restrictor in said means for conveying second liquid from said bearings.

9. The roll of claim 1, wherein said peripheral surface is a cylindrical surface and said marginal sections are coaxial with and have diameters matching the diameter of said main section.

10. The roll of claim 1, wherein each of said dividing means defines for the respective secondary stream a path having a predetermined cross-sectional area.

11. The roll of claim 1, wherein said conveying means include portions which convey the primary streams of second liquid from the respective dividing means to and beyond the respective bearings, said varying means being provided in said portions of said conveying means.

12. The roll of claim 11, wherein said varying means comprises at least one flow restrictor in said conveying means.

13. The roll of claim 1, wherein each of said conveying means includes a first portion connecting said source with the respective dividing means and a second portion for the respective primary stream.

14. The roll of claim 1, further comprising first and second sealing means provided between said carrier and the respective end portions of said shell axially outwardly adjacent the respective bearings, said feeding means further including means for conveying second liquid from said first and second bearings past and radially inwardly of the respective sealing means.

15. The roll of claim 1, further comprising first and second sealing means provided between said carrier and the respective end portions of said shell axially outwardly adjacent the respective bearings, at least one of said sealing means including a first annular member rotatable with said shell and a second annular member provided on said carrier adjacent said first annular member, one of said annular members being movable relative to and being biased by second liquid against the other of said annular members.

16. The roll of claim 15, wherein said other annular member is of one piece with said shell.

17. The roll of claim 1, further comprising means for rotating said shell relative to said carrier, said rotating means including a housing which surrounds said carrier adjacent one end portion of said shell, and further comprising at least one seal interposed between said housing and said one end portion, said feeding means defining at least one path for the flow of second liquid through said housing.

18. A controlled deflection roll comprising a carrier; a flexible rotary shell spacedly surrounding said carrier and having first and second end portions and a peripheral surface including first and second marginal sections surrounding the respective end portions of said shell and a main section between said marginal sections; hydraulic shell deforming means disposed between said carrier and said shell radially inwardly of said main section; first and second bearings disposed between said carrier and the respective end portions of said shell; means for supplying a first liquid to said deforming means; means for feeding a second liquid to said bearings comprising a source of second liquid, means for conveying first and second main streams of second liquid from said source toward the respective bearings, and means for dividing each of said main streams into a primary stream flowing to the respective bearing and a secondary stream flowing toward said deforming means; first and second sealing means provided between said carrier and the respective end portions of said shell axially outwardly adjacent the respective bearings, at least one of said sealing means including a first annular member rotatable with said shell and a second annular member provided on said carrier adjacent said first annular member, one of said annular members being movable relative to and being biased by second liquid against the other of said annular members, said feeding means further including means for conveying second liquid from said first and second bearings past and radially inwardly of the respective sealing means; and means for varying the rate of feed of said second liquid.

19. The roll of claim 18, wherein said other annular member is one piece with said shell.

20. The roll of claim 18, wherein each of said flow dividing means comprises a first annular component and an axially movable second annular component adjacent said first component and defining therewith at least one hydrostatic pocket which establishes a path for the respective secondary stream, each second component being acted upon and being biased against the respective first component by the respective main stream of second liquid.

21. The roll of claim 20, wherein one annular component of each of said flow dividing means is rotatable with said shell and the other annular component of each of said dividing means is provided on said carrier.

* * * * *